(12) United States Patent
Lu et al.

(10) Patent No.: US 7,513,011 B2
(45) Date of Patent: Apr. 7, 2009

(54) HINGE WITH MULTIPLE TORSION SPRINGS

(75) Inventors: Sheng-Nan Lu, Taipei Hsien (TW); Wei-Chun Chen, Taipei Hsien (TW); Shu-Mu Lin, Taipei Hsien (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 478 days.

(21) Appl. No.: 11/321,221

(22) Filed: Dec. 29, 2005

(65) Prior Publication Data

US 2007/0151079 A1 Jul. 5, 2007

(51) Int. Cl.
*E05C 17/64* (2006.01)
(52) U.S. Cl. .............. 16/337; 361/681; 248/292.13; 248/918; 16/342; 16/340
(58) Field of Classification Search ............ 16/337, 16/285, 299, 304, 305, 308, 338, 340, 307; 248/291.1, 292.11, 292.13, 917
See application file for complete search history.

(56) References Cited

U.S. PATENT DOCUMENTS

| | | | | |
|---|---|---|---|---|
| 5,467,504 A | * | 11/1995 | Yang | 16/342 |
| 6,145,797 A | * | 11/2000 | Uehara | 248/291.1 |
| 6,347,433 B1 | * | 2/2002 | Novin et al. | 16/367 |
| 6,532,628 B2 | * | 3/2003 | Kim | 16/342 |
| 6,929,224 B1 | * | 8/2005 | Masuda et al. | 248/176.3 |
| 7,444,716 B2 | * | 11/2008 | Hsu | 16/366 |
| 2003/0140457 A1 | * | 7/2003 | Kida | 16/342 |
| 2004/0055114 A1 | * | 3/2004 | Lu | 16/340 |
| 2008/0034543 A1 | * | 2/2008 | Hsu et al. | 16/346 |

* cited by examiner

*Primary Examiner*—Victor Batson
*Assistant Examiner*—Emily M Morgan
(74) *Attorney, Agent, or Firm*—Alan Kamrath Kamrath & Associates PA

(57) ABSTRACT

A hinge has a first bracket, a pivot pin, a second bracket and two torsion spring assemblies. The first bracket has a support and two holders. The pivot pin is mounted rotatably through the support and the holders on the base of the first bracket. The second bracket is mounted to the pivot pin. The torsion spring assemblies are mounted on the pivot pin and correspond respectively to the holders on the first bracket. Each torsion spring assembly has a disk and a torsion spring. The disk is mounted securely to the pivot pin and has a spring hook. The torsion spring is mounted around the pivot pin and has two ends. One end is mounted securely on the corresponding holder, and the other end is engaged detachably with the spring hook on the disk. The torsion springs provide a recovering force to keep the pivot pin from pivoting inadvertently.

5 Claims, 4 Drawing Sheets

HINGE WITH MULTIPLE TORSION SPRINGS

BACKGROUND OF THE INVENTION

1. Field of the Invention

The present invention relates to a hinge and, more particularly, to a hinge that has a pivot pin and multiple torsion springs for keeping the pivot pin from pivoting inadvertently when the pivot pin connects to a heavy object such as a large size monitor body.

2. Description of Related Art

Liquid crystal display (LCD) monitors are used widely these days. A monitor has a body, a stand and a hinge mounted between the stand and the body. The hinge has a first bracket, a pivot pin and a second bracket. The first bracket is mounted to the stand. The pivot pin is attached rotatably on the first bracket through a nut screwing onto the pivot pin. The tightness between the pivot pin and the first bracket can be adjusted by loosening or tightening the nut. The second bracket is attached to the pivot pin and is mounted to the body so the body can pivot relative to the stand with the pivot pin rotating on the first bracket on the stand.

However, the size of the body of the monitor is getting larger and larger, and the weight of the large size body applies a large load to the second bracket and causes the pivot pin to rotate inadvertently even though the nut is tightened.

To overcome the shortcomings, the present invention provides a hinge with multiple torsion springs to mitigate or obviate the aforementioned problems.

SUMMARY OF THE INVENTION

The main objective of the invention is to provide a hinge that has a pivot pin and multiple torsion springs to keep the pivot pin from pivoting inadvertently when the pivot pin connects to a heavy object such as a large size monitor body.

A hinge in accordance with the present invention comprises a first bracket, a pivot pin, a second bracket and two torsion spring assemblies.

The first bracket has a support and two holders.

The pivot pin is mounted rotatably through the support and the holders on the base of the first bracket.

The second bracket is mounted to the pivot pin.

The torsion spring assemblies are mounted on the pivot pin, correspond to the holders on the first bracket and each torsion spring assembly has a disk and a torsion spring. The disk is mounted securely to the pivot pin and has a spring hook. The torsion spring is mounted around the pivot pin and has two ends. One end is mounted securely on the holder and the other end is engaged detachably with the spring hook on the disk.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
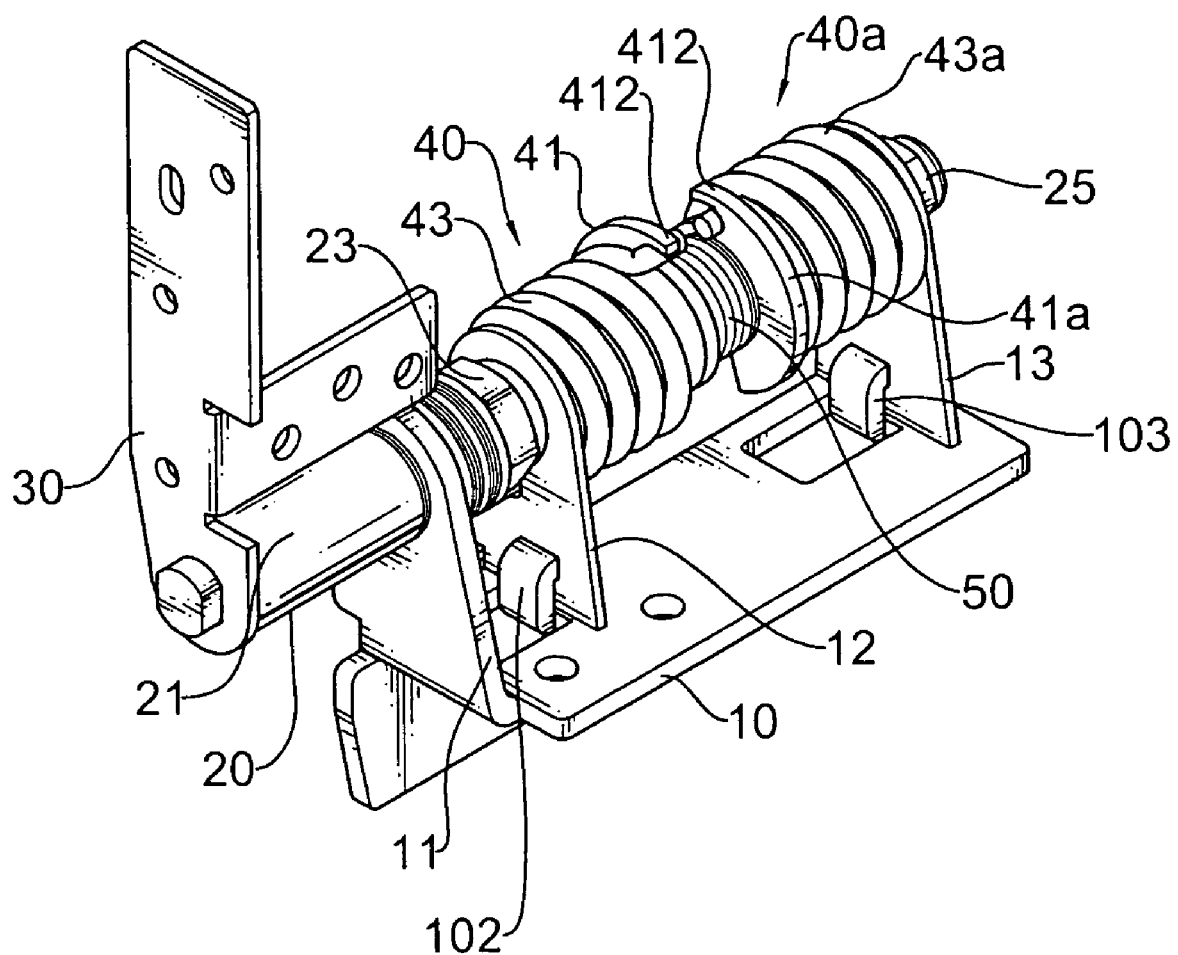
FIG. 1 is a perspective view of a hinge with multiple torsion springs in accordance with the present invention.
Figure 2:
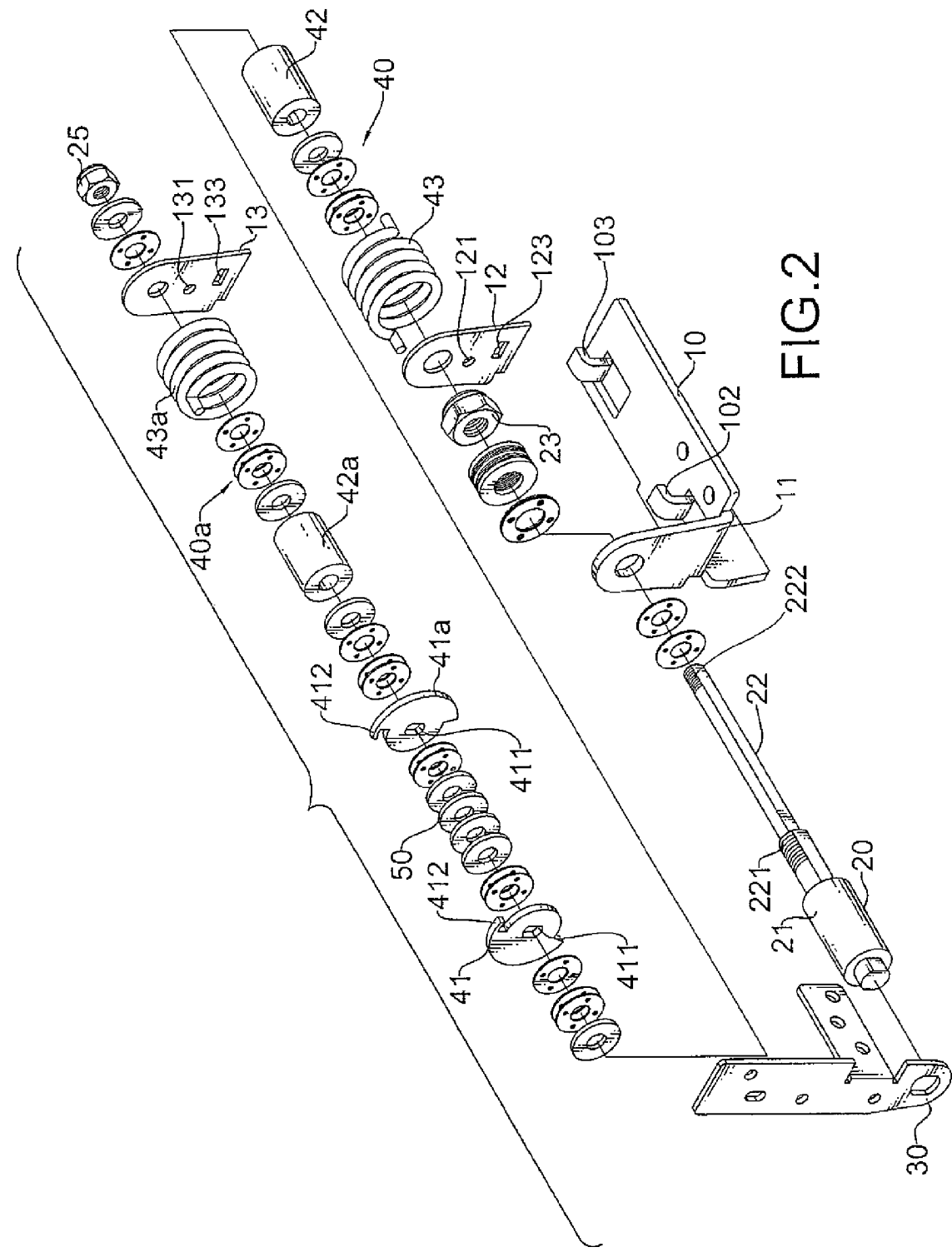
FIG. 2 is an exploded perspective view of the hinge in FIG. 1.

With reference to FIGS. 1 and 2, a hinge in accordance with the present invention is used with a monitor having a body and a stand and may be used with a like object composed of two separate parts.

The hinge is mounted between the body and the stand and has a first bracket (10), a pivot pin (20), a second bracket (30), two torsion spring assemblies (40, 40*a*) and at least one washer (50).

The first bracket (10) is mounted to the stand and has a base, a support (11) and two holders (12, 13). The base of the first bracket (10) has two ends and two mounting hooks (102, 103). The mounting hooks (102, 103) are formed on the base of the first bracket (10). The support (11) extends perpendicularly from one end of the base of the first bracket (10) and has a pivot hole defined through the support (11). The holders (12, 13) are mounted on the base of the first bracket (10) and correspond to the mounting hooks (102, (103). Each holder (12, 13) has a pivot hole, a mounting hole (121, 131) and a mounting slot (123, 133). The pivot hole and the mounting hole (121, 131) are defined through the holder (12, 13). The pivot holes in the holders (12, 13) are aligned with the pivot hole in the support (11). The mounting slot (123, 133) is defined through the holder (12, 13) and allows a corresponding one of the mounting hooks (102, 103) to hook into the mounting slot (123, 133) so the holder (12, 13) is mounted securely onto the base of the first bracket (10).

The pivot pin (20) is mounted rotatably through the pivot holes in the support (11) and the holders (12, 13) on the base of the first bracket (10) and has an enlarged head (21), a shaft (22), and two nuts (23, 25). The enlarged head (21) abuts the support (11) and has two ends. The shaft (22) protrudes from one end of the enlarged head (21), rotatably extends through the pivot holes in the support (11) and the holders (12, 13) and has a distal end, a non-circular cross Section and two outer threads (221,222). One outer thread (221) is formed on the shaft (20) adjacent to the enlarged head (21) and the other outer thread (222) is formed on the distal end of the shaft (22). The nuts (23, 25) are respectively screwed on the outer threads (221, 222). The nut (23) adjacent to the enlarged head (21) is Located aside the support (11) opposite to the enlarged head (21), and the other nut (25) on the distal end of the shaft (22) abuts with one holder (13) to keep the pivot pin (20) from falling Out of the first bracket (10).

The second bracket (30) is mounted on the enlarged head (21) of the pivot pin (20) and is attached to the body of the monitor.

The torsion spring assemblies (40, 40*a*) are mounted on the pivot pin (20), correspond respectively to the holders (12, 13) on the first bracket (10) and provide torsion force to keep the pivot pin (20) from pivoting unexpectedly. Each torsion spring assembly (40, 40*a*) has a disk (41, 41*a*), a sleeve (42, 42*a*) and a torsion spring (43, 43*a*).

The disk (41, 41*a*) is mounted securely around the shaft (22) and has a mounting hole (411) and a spring hook (412). The mounting hole (411) is defined through the disk (41, 41*a*), allows the shaft (22) to extend through the mounting hole (411) and has a non-circular cross section corresponding to the non-circular cross section of the shaft (22). The non-circular cross sections of the mounting hole (411) and the shaft (22) keep the disk (41, 41a) from rotating relative to the pivot pin (20). The spring hook (412) is formed on the disk (41, 41a). The spring hooks (412) on the disks (41, 41a) of the torsion spring assemblies (40, 40a) are formed in opposite directions perpendicular to the pivot pin (20).

The sleeve (42, 42a) is mounted around the shaft (22) of the pivot pin (20) between the disk (41, 41a) and the corresponding holder (12, 13) on the first bracket (10) and has a mounting hole defined through the sleeve (42, 42a) and through which the shaft (22) of the pivot shaft (20) extends.

Figure 3:
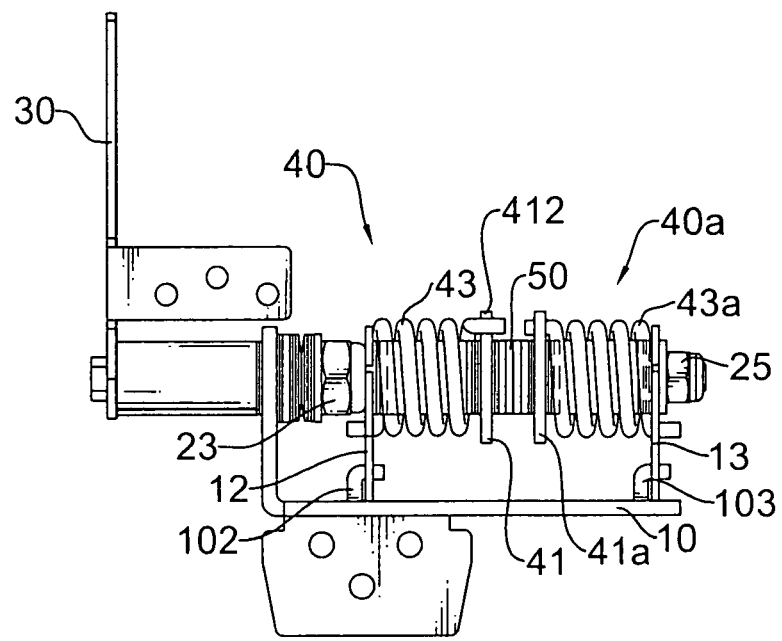
FIG. 3 is a front view of the hinge in FIG. 1.
Figure 4:
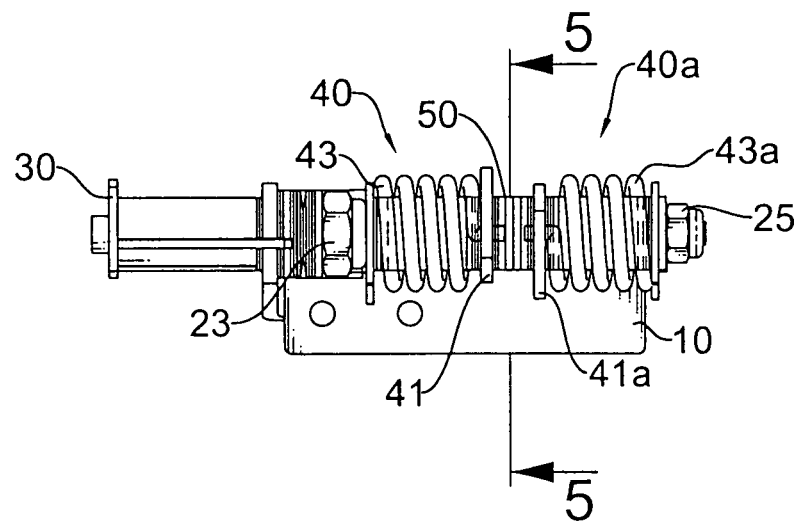
FIG. 4 is a top view of the hinge in FIG. 1.

With reference to FIGS. 2, 3 and 4, the torsion spring (43, 43a) is mounted around the sleeve (42, 42a) on the shaft (22) of the pivot pin (20) between the disk (41, 41a) and the corresponding holder (12, 13) and has two ends. One end of the torsion spring (43, 43a) is mounted in the mounting hole (121, 131) in the corresponding holder (12, 13) and the other end is hooked detachably onto the spring hook (412) on the disk (41, 41a).

Figure 5:
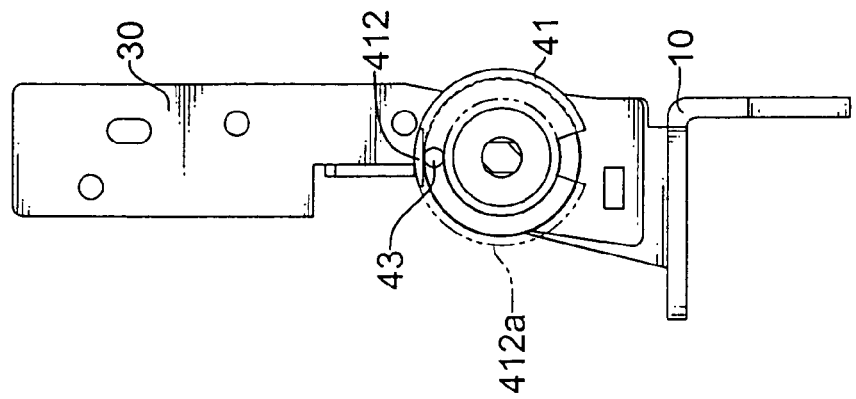
FIG. 5 is a cross sectional side view of the hinge along line 5-5 in FIG. 4.
Figure 6:
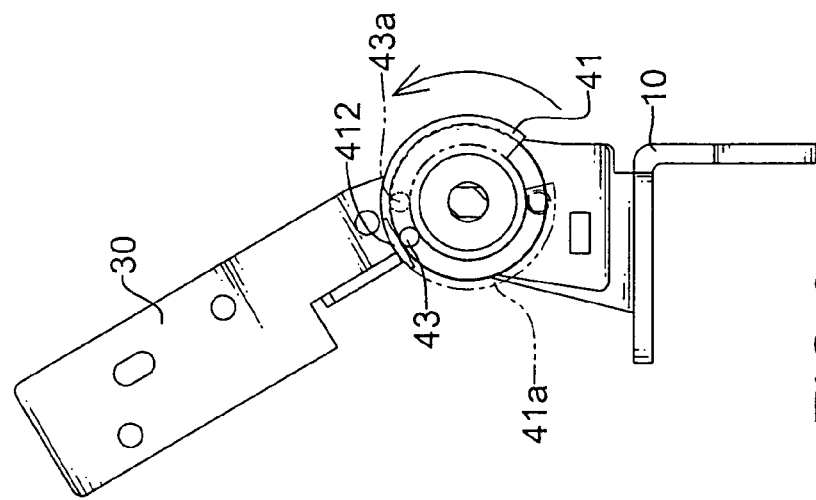
FIG. 6 is an operational cross sectional side view of the hinge in FIG. 5 showing that the second bracket is rotated in a direction.

With further reference to FIGS. 5 and 6, pivoting the body on the second bracket (30) in one direction causes the pivot pin (20) and the disks (41, 41a) to rotate with the second bracket (30). The spring hook (412) on one of the disks (41) hooks and pulls the end of a corresponding torsion spring (43) and twists the corresponding torsion spring (43). The twisted torsion spring (43) provides a recovering force against the rotating pivot pin (20) to keep the body attached to the second bracket (30) from pivoting inadvertently when no further external force applies to the second bracket (30).

Figure 7:
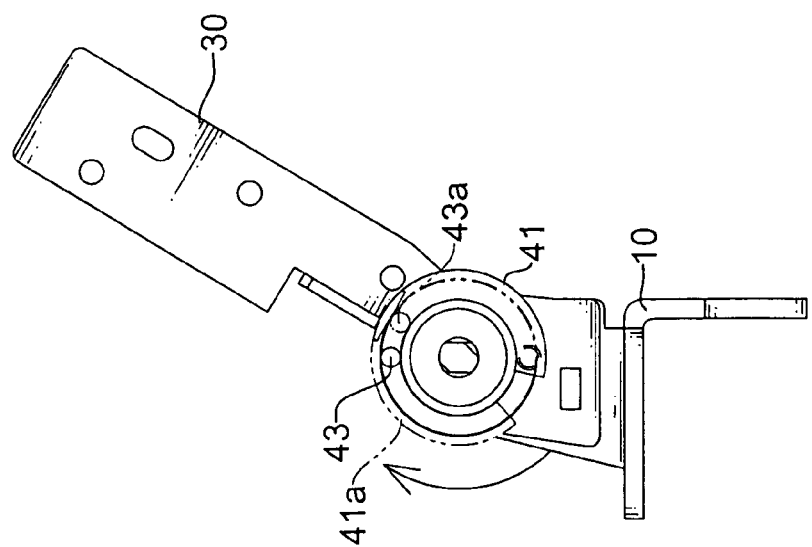
FIG. 7 is an operational cross sectional side view of the hinge in FIG. 5 showing that the second bracket is rotated in a reverse direction.

With reference to FIGS. 5 and 7, pivoting the body on the second bracket (30) in a reverse direction causes the spring hook (412) on the other disk (41a) to twist the other torsion spring (43a) to generate a recovering force to hold the body without pivoting inadvertently when no further external force is added to the second bracket (30).

The at least one washer (50) is mounted around the shaft (22) on the pivot pin (20) between the disks (41, 41a) of the torsion spring assemblies (40) and prevents friction between the disks (41,41a).

The torsion spring (43, 43a) provides recovering force to react against the weight of the monitor body on the second bracket (30) so the monitor body can be held securely by the hinge without pivoting inadvertently.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising:
    a first bracket having
        a base;
        a support extending from the base and having a pivot hole defined through the support; and
        two holders mounted on the base and each holder having a pivot hole defined through the holder and aligning with the pivot hole in the support;
    a pivot pin rotatably mounted through the pivot holes in the support and the holders on the base of the first bracket and having
        an enlarged head abutting with the support and having two ends;
        a shaft protruding from one end of the enlarged head, rotatably extending through the pivot holes in the support and the holders and having a distal end, two outer threads and one outer thread formed on the shaft adjacent to the enlarged head and the other outer thread formed on the distal end of the shaft; and
        two nuts respectively screwed on the threads, the nut adjacent to the enlarged head located aside the support opposite to the enlarged head and the other nut on the distal end of the shaft abutting with one of the holders;
    a second bracket mounted to the pivot pin; and
    two torsion spring assemblies mounted on the pivot pin, corresponding respectively to the holders on the first bracket, with each torsion spring assembly having
        a disk mounted securely, to the pivot pin and having a mounting hole defined through the disk and through which the pivot pin extends and a spring hook formed on the disk; and
        a torsion spring mounted around the pivot pin between the disk and a corresponding holder on the first bracket, having two ends with one end mounted to the corresponding holder and the other end hooked detachably onto the spring hook on the disk;
    wherein the spring hooks on the disks of the torsion spring assemblies are formed in opposite directions perpendicular to the pivot pin.

2. The hinge as claimed in claim 1, wherein the shaft of the pivot pin further has a non-circular cross section and the mounting hole of each disk has a non-circular cross section corresponding to the non-circular cross section of the shaft.

3. The hinge as claimed in claim 2 further comprising at least one washer mounted around the pivot pin between the disks of the torsion spring assemblies.

4. The hinge as claimed in claim 3, wherein each torsion spring assembly further has a sleeve mounted around the pivot pin between the disk and the corresponding holder and around which the torsion spring is mounted.

5. The hinge as claimed in claim 4, wherein each holder of the first bracket further has a mounting slot defined through the holder and the base further has two mounting hooks formed on the base and respectively hooked into the mounting slots in the holders to securely mount the holders on the base.

* * * * *